(12) United States Patent
Warther et al.

(10) Patent No.: US 7,845,569 B1
(45) Date of Patent: Dec. 7, 2010

(54) PERMANENT RFID LUGGAGE TAG WITH SECURITY FEATURES

(75) Inventors: Richard O. Warther, West Chester, PA (US); John Thorn, III, Wayne, PA (US)

(73) Assignee: Vanguard Identification Systems, Inc., West Chester, PA (US)

( * ) Notice: Subject to any disclaimer, the term of this patent is extended or adjusted under 35 U.S.C. 154(b) by 0 days.

(21) Appl. No.: 12/416,637

(22) Filed: Apr. 1, 2009

Related U.S. Application Data

(63) Continuation-in-part of application No. 11/735,891, filed on Apr. 16, 2007, which is a continuation of application No. 11/099,998, filed on Apr. 6, 2005, now Pat. No. 7,204,652, which is a continuation-in-part of application No. 10/279,752, filed on Oct. 23, 2002, now Pat. No. 6,994,262, which is a continuation-in-part of application No. 09/532,113, filed on Mar. 21, 2000, now Pat. No. 6,769,718, and a continuation-in-part of application No. 09/595,825, filed on May 16, 2000, now abandoned.

(60) Provisional application No. 61/041,454, filed on Apr. 1, 2008, provisional application No. 60/401,789, filed on Aug. 7, 2002, provisional application No. 60/139,684, filed on Jun. 16, 1999.

(51) Int. Cl.
*G06K 19/06* (2006.01)
*G06F 17/00* (2006.01)

(52) U.S. Cl. .......................... 235/492; 235/487; 235/375

(58) Field of Classification Search ........................ None
See application file for complete search history.

(56) References Cited

U.S. PATENT DOCUMENTS 4,861,644 A 8/1989 Young et al.
4,978,146 A 12/1990 Warther et al.

(Continued)

FOREIGN PATENT DOCUMENTS

WO WO-2006/052422 5/2006

(Continued)

OTHER PUBLICATIONS

*High Definition Printing t™ for Maximum Security Identification Cards.* Technology White Paper. 2008. HID Global. 4 pages. www.hidglobal.com.

(Continued)

*Primary Examiner*—Michael G Lee
*Assistant Examiner*—Matthew Mikels
(74) *Attorney, Agent, or Firm*—Panitch Schwarze Belisario & Nadel LLP

(57) ABSTRACT

An integral, one-piece, resiliently flexible, planar, reusable, programmable radio frequency identification (RFID) luggage tag blank has a planar flexible sheet core of at least first and second microporous polymer material strips fixedly and permanently joined together completely surrounding an RFID transponder assembly, the transponder assembly collapsing the microporosity of the core strip material enough to maintain an essentially uniform core, the transponder assembly including non-volatile memory containing a non-alterable permanent unique code assigned to the transponder assembly and space to receive externally programmable information; and a first cover strip selected to receive a dye diffusion thermal transfer image and secured to the first major outer side of the core.

20 Claims, 3 Drawing Sheets

U.S. PATENT DOCUMENTS

| | | | |
|---|---|---|---|
| 5,233,167 A | 8/1993 | Markman et al. | |
| 5,340,968 A | 8/1994 | Watanabe et al. | |
| 5,366,249 A | 11/1994 | Diemert | |
| 5,478,991 A | 12/1995 | Watanabe et al. | |
| 5,495,981 A | 3/1996 | Warther | |
| 5,581,257 A | 12/1996 | Greene et al. | |
| 5,693,766 A | 12/1997 | Bradbury | |
| 5,743,567 A | 4/1998 | Warther | |
| 5,769,457 A | 6/1998 | Warther | |
| 5,838,253 A | 11/1998 | Wurz et al. | |
| 5,863,076 A | 1/1999 | Warther | |
| 5,912,981 A | 6/1999 | Hansmire et al. | |
| 6,010,159 A | 1/2000 | Warther | |
| 6,039,356 A | 3/2000 | Warther et al. | |
| 6,050,622 A | 4/2000 | Gustafson | |
| 6,089,611 A | 7/2000 | Blank | |
| 6,290,138 B1 | 9/2001 | Ohno et al. | |
| 6,305,716 B1 | 10/2001 | Warther et al. | |
| 6,325,294 B2 | 12/2001 | Tuttle et al. | |
| 6,588,658 B1 | 7/2003 | Blank | |
| 6,693,544 B1 | 2/2004 | Hebbecker | |
| 6,769,718 B1 | 8/2004 | Warther et al. | |
| 6,942,155 B1 | 9/2005 | Stewart et al. | |
| 6,994,262 B1 | 2/2006 | Warther | |
| 7,153,620 B2 | 12/2006 | Aylward et al. | |
| 7,193,504 B2 | 3/2007 | Carrender et al. | |
| 7,204,652 B2 | 4/2007 | Warther | |
| 7,225,993 B2 | 6/2007 | Warther | |
| 7,236,151 B2 | 6/2007 | Doane et al. | |
| 7,377,445 B1 | 5/2008 | Stewart et al. | |
| 7,479,940 B2 | 1/2009 | Marhefka | |
| 2003/0173408 A1 | 9/2003 | Mosher, Jr. et al. | |
| 2004/0119593 A1* | 6/2004 | Kuhns | 340/572.7 |
| 2005/0108912 A1 | 5/2005 | Bekker | |
| 2006/0032907 A1 | 2/2006 | Ziercher | |
| 2006/0124757 A1* | 6/2006 | Warther | 235/492 |
| 2007/0152826 A1* | 7/2007 | August et al. | 340/572.1 |
| 2008/0099723 A1 | 5/2008 | Nose et al. | |
| 2008/0273023 A1 | 11/2008 | Nose et al. | |
| 2009/0040048 A1* | 2/2009 | Locker et al. | 340/572.1 |

FOREIGN PATENT DOCUMENTS

| | | |
|---|---|---|
| WO | WO-2007/011514 | 1/2007 |

OTHER PUBLICATIONS

*The Future of Electronic Paper*. Oct. 15, 2007. 9 pages. http://thefutureofthings.com/articles/1000/the-future-of-electronic-paper.html by The Future of Things.

www.ier.fr 2007© Discussion of Air Transportation and baggage handling. 7 pages.

* cited by examiner

PERMANENT RFID LUGGAGE TAG WITH SECURITY FEATURES

CROSS-REFERENCE TO RELATED APPLICATIONS

This application is a Continuation-in-part of Ser. No. 11/735,891, which was filed on Apr. 16, 2007 entitled "Printed Planar Radio Frequency Identification Elements"; which is a Continuation of Ser. No. 11/099,998 filed on Apr. 6, 2005, is now U.S. Pat. No. 7,204,652, issued on Apr. 17, 2007, entitled "Printed Planar Radio Frequency Identification Elements"; which is a Continuation-in-part of Ser. No. 10/279,752, filed on Oct. 23, 2002, is now U.S. Pat. No. 6,994,262 issued on Feb. 7, 2006, entitled "Printed Sheet Products with Integral, Removable, Radio Frequency Identification Elements"; which is Continuation-in-part of Ser. No. 09/532,113, filed on Mar. 21, 2000, is now U.S. Pat. No. 6,769,118 issued Aug. 3, 2004, entitled "Transaction Card Mailer and Method of Making"; which is a Continuation-in-part of Ser. No. 09/595,825, filed on May 15, 2000, now abandoned. This application further claims the benefit of priority of U.S. Provisional Patent Application No. 61/041,454, entitled, "Permanent RFID Luggage Tag With Security Features", filed Apr. 1, 2008 which is incorporated by reference herein in its entirety and 60/401,789, filed on Aug. 7, 2002, entitled "Credit/debit Tags with Magnetic Strip Data Storage"; and 60/139,684, filed on Jun. 16, 1999, entitled "Printed Forms with Integral Removable Identification Elements".

BACKGROUND OF THE INVENTION

The present invention relates to printed identification tags and, in particular, to reusable baggage tags.

Travelers are encouraged to tag their baggage to assist in owner identification. Many travelers use permanent tags with personal information printed or hand written. Some bags are equipped with viewing compartments configured to receive a conventional business card carrying the same information. Virtually all airlines request travelers to mark their bags. Most airlines will even provide travelers with disposable tags on which the traveler can provide personal identification and contact information if the traveler's bags do not include their own tags.

One major drawback of such tags is that they are not integrated into airline baggage handling systems, which utilize special, machine readable disposable tags applied by the airlines to each piece of baggage given over to the airline to transport.

Another major drawback is that the machine readable disposable tags applied by the airlines are not reusable. Discarded machine readable baggage tags create over a million pounds of waste per year.

It would be beneficial to provide a permanent baggage tag that could be used repeatedly by travelers and be capable of integration into a carrier baggage management system for simultaneous reuse by one or more baggage carriers.

BRIEF SUMMARY OF THE INVENTION

Briefly stated, the present invention an integral, one-piece, resiliently flexible, planar, reusable, programmable radio frequency identification (RFID) luggage tag blank comprising: a planar flexible sheet core having major planar opposing first and second sides, the core including at least first and second core strips of flexible, microporous polymer material fixedly and permanently joined together, the microporosity being provided by pores located substantially throughout the microporous polymer material; a first cover strip integrally and permanently secured to the first major outer side of the core, the first cover strip being coextensive with and forming a first outer side of the tag, the first cover strip including a non-porous, polymer film layer selected to receive a dye diffusion thermal transfer image; an RFID transponder assembly permanently and integrally imbedded between the first and second first core strips, partially collapsing the porosity of the core strip material enough to maintain an essentially uniform thickness with the transponder assembly imbedded, the transponder assembly including non-volatile memory containing a non-alterable permanent unique code assigned to the transponder assembly and space to receive externally programmable information, both the code and information being transmitted by the transponder assembly upon interrogation; and a unique code permanently printed on at least one the first and second major sides of the tag, the code being unique to the tag and to the RFID assembly. Other aspects of the invention includes methods of using the blank to make a luggage tag and methods of using the tag so made.

BRIEF DESCRIPTION OF THE DRAWINGS

The foregoing summary, as well as the following detailed to uniquely identify that inlay chip description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

FIG. 4 illustrates the steps of typical processing of the printed planar baggage tag of FIGS. 1-3 at check-in.

DETAILED DESCRIPTION OF THE INVENTION

Figure 1:
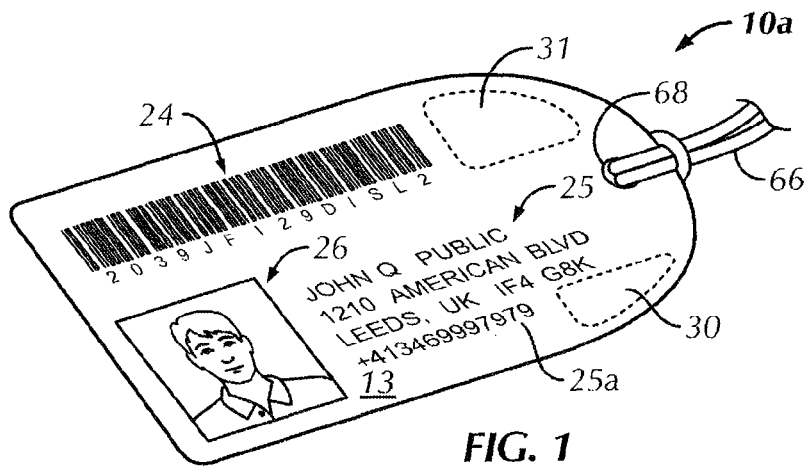
FIG. 1 is a perspective view of a "front" side of a first exemplary embodiment printed planar baggage tag according to the present invention.
Figure 2:
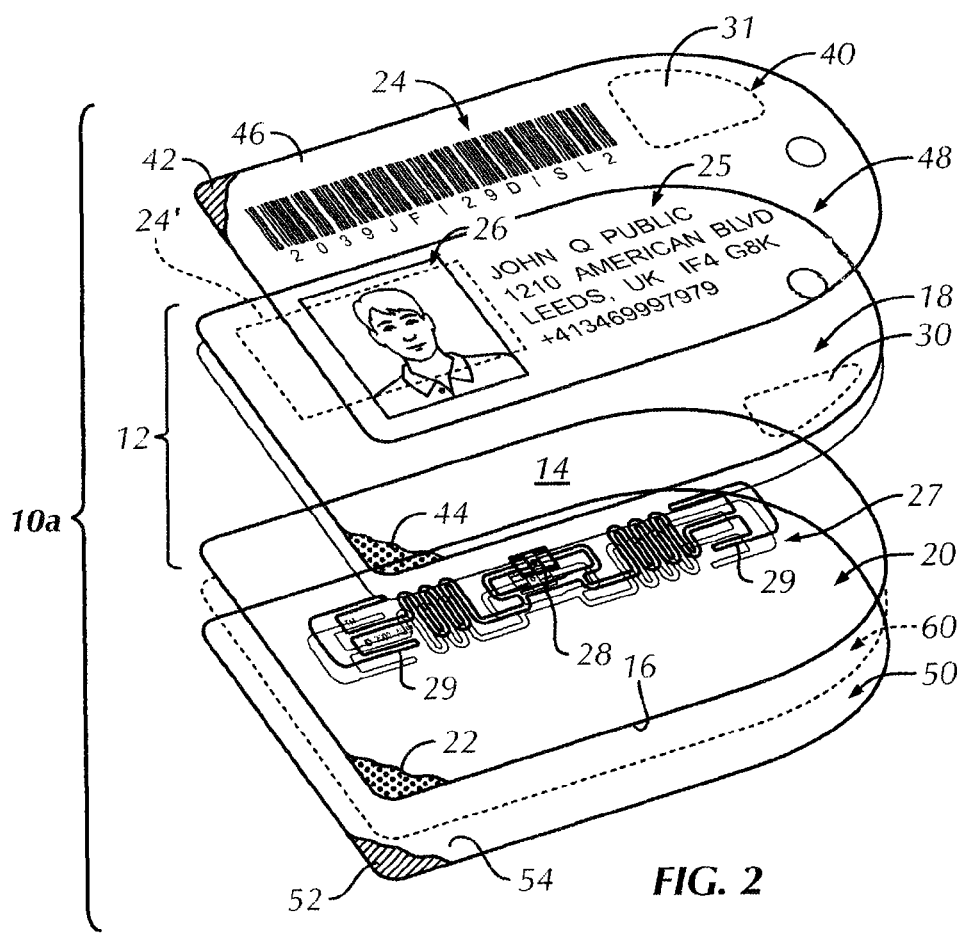
FIG. 2 is an exploded view of the printed planar baggage tag of FIG. 1.
Figure 3:
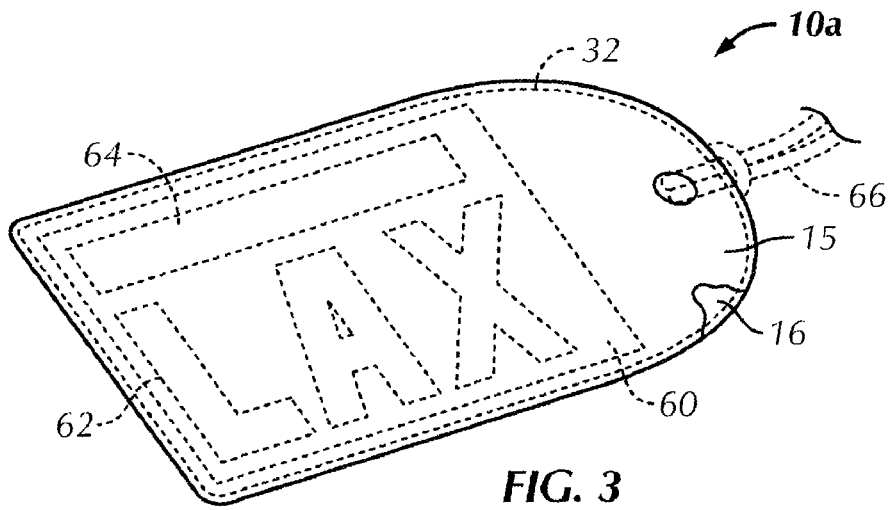
FIG. 3 is a perspective view of the "rear" side of the printed planar baggage tag of FIGS. 1 and 2.

FIGS. 1-3 depict a first exemplary embodiment, multilayer, integral, one-piece individual printed identification element in the form of a resiliently flexible, planar, reusable, programmable radio frequency identification (RFID) baggage tag according to the present invention indicated generally at 10a. Element/tag 10a has first and second opposing major planar outer sides 13 and 15 indicated and depicted in FIGS. 1 and 3, respectively.

The element/tag 10a of FIGS. 1-3 includes a planar, flexible sheet core indicated generally at 12 having major planar opposing first and second sides 14 and 16. The first or "front" major planar side 14 is depicted in FIGS. 1 and 2. A second or "rear" major planar side 16 is depicted in FIG. 3. Core 12 is preferably formed by at least first and second core strips 18, 20 fixedly and permanently joined together around a radio frequency identification (RFID) transponder assembly inlay indicated generally at 27 in FIG. 2. Each of the first and second core strips 18, 20 is integral, planar, flexible and, according to an important aspect of the invention, each is preferably of a microporous polymer material that can at least partially collapsed around the RFID transponder assembly inlay 27 as will be described. The microporosity is provided by micropores located substantially throughout the microporous polymer material. The first or "front" major planar outer side 14 is formed by an exposed major side of the first core strip 18. The second or "rear" opposing major planar side 16 of core 12 is formed by an exposed major side of the second core strip 20. If desired, an anti-counterfeiting tag agent ("taggent") can be provided to either or both core strips 18, 20. For example UV and/or IR light responsive agent(s) can be provided on either or both core sides 14, 16 as disbursed spots or microscopic images printed.

Referring back to FIG. 2, a first cover strip indicated generally at 40 is integrally and permanently secured to the core 12 over the exposed major side of the first core strip 18 forming the first or "front" major planar side 14 of the core 12. The first cover strip 40 may be secured with the core 12 by an appropriate adhesive layer 44, preferably a heat or light activated adhesive for permanence. First cover strip 40 forms and is coextensive with the first major planar outer side 13 of the tag 10a and, preferably is further coextensive with the first major side 18 of the core 12 as well. According to an important aspect of the invention, the first cover strip 40 is a non-porous polymer film layer 42 that bears or is capable of receiving and bearing a dye diffusion thermal transfer ("d2t2") image indicated generally at 48 printed directly on a polymer film layer 42 such as polyvinyl chloride (PVC) or, alternatively, in a coating 46 on the outward facing surface of the polymer layer 42. Such a latter sheet product is supplied by Transilwrap Company Inc. of Franklin Park, Ill., under the name "Trans-Kote® SCF Laminating Film", which has a proprietary coating on a polyester (PE) film stock.

In the depicted embodiment 10a, a second cover strip 50 is preferably provided, also integrally secured to the second core strip 20 forming the second, "rear" major planar side 16 of the core 12 at least for protection of the core. Second cover strip 50 suggestedly is again a non-porous polymer film layer 52 permanently and integrally secured to the second side 16 of the core 12 by an appropriate adhesive layer 54, preferably a heat or light activated adhesive for permanence. Second cover strip 50 is also coextensive with and forms the second outer side 15 of the tag 10a and is also preferably coextensive with the second side 16 of the core 12 as well. The second cover strip 50 may be PE or polyester base or may be another polymer like PVC, polycarbonate (PC), polyphenyl delta-butylene (PdB), or other vinyl/polyester composites.

According to the invention, at least one or more typically a plurality of variable data fields are printed and visible on one or both major sides 13, 15 of the tag 10a. Referring back to FIG. 1, the first major side 13 of the tag 10a is shown printed permanently in ink(s) with a plurality of spaced-apart, variable data fields, three variable data fields being identified at 24, 25 and 26. First variable data field 24 is printed in permanently ink(s) with a unique code namely, "2039JFI29DISL2" in the indicated example. The unique code is printed in machine readable format like a bar code, may be printed in human and optical readable character format or preferably, as indicated in tag 10a, in both formats so that all printed unique codes are capable of being visually as well as machine read. Preferably, at least one unique tag identification code printed in ink in one of the variable data fields is or includes a unique identifier assigned to the RFID chip 28 or transponder assembly 27 during its manufacture. This can be used as the unique tag identification code 24 or as at least part of that code of the tag as well as a way to identify the RFID chip/assembly should the tag malfunction. Variable data field 25 is printed for example with a unique name and address combination of an individual assigned the tag 10a. Variable data field 26 is printed with an image of the individual named in variable data field 25. The information in each variable field 25 and 26 should uniquely identify the one individual to whom the tag 10a is assigned. Other unique codes can be printed in these or other variable data fields, if provided. For example, the text in variable data field 25 might include a telephone or passport or driver's license number 25a, if desired. All would also be unique. The unique identification code can be printed on the outside of the tag, for example on the first cover layer 40 as indicated in solid in FIG. 2, or on the core 12 during tag manufacture as indicated diagrammatically by phantom block 24'.

In addition to the variable data fields 24-26, the tag 10a typically includes one or more printed static graphic fields, three separate static graphic fields 30, 31, 32 being indicated in block diagram form, in phantom in FIGS. 1-3. Static graphic fields generally may be a graphic image or text or a combination, which is typically repeated identically on each other individual printed sheet product/luggage tag of a collection or set of like product/baggage tags. Decorative static graphics need not be identical on each individual sheet product 10a but would typically be provided in a single pattern that might span several adjoining individual tags when the tags were being manufactured. However, static graphic fields are distinguished from variable data fields in that static graphic fields carry no data unique to the tag. It will be appreciated that static graphic field(s), in particular, can be printed on either or both major planar sides 14, 16 of the core 12 (e.g. field 30 on side 14) and/or on either cover strip, field 31 on cover strip 40 and/or field 32 on cover strip 50 (see FIG. 3). Preferably, to the extent feasible, static graphic fields are suggestedly printed on the outer sides 14, 16 of the core 12, the porous sheet material(s) forming the core being highly receptive to various forms of digitally controlled printing and the printing being protected by the cover strips 40, 50, if transparent.

Details of preferred methods of manufacture and materials, including preferred microporous polysilicate materials for tags like luggage tags 10a (other than the provision of dye diffusion thermal transfer (d2t2) images) are disclosed in U.S. Pat. No. 7,204,652 issued Apr. 17, 2007 and application Ser. No. 11/735,891, filed Apr. 16, 2007, both incorporated by reference herein in their entireties. As described, tags are typically manufactured in bulk in sets, either in individual sheets of multiple tags or continuous webs. Individual tags in such sheets or webs are conveniently formed by mechanical scoring in such a way that they are retained in the sheets or web with other scored tags of the set. As indicated in those references, tags can be provided in multiple sets and/or with other identification elements such as cards and/or labels as individual sheet products and such individual sheet products themselves scored from individual sheets and continuous webs. Preferably the same unique code is printed in machine and human readable format on each individual identification element in the sheet product and may be printed elsewhere of the individual sheet product as well. Finally, the scoring used to form the individual tag 10a and/or individual sheet product also preferably provides the 10a with a closed perimeter opening 68 located entirely within and extending transversely entirely through the tag 10a to receive a strap 66 for attachment to luggage.

As noted earlier, tag 10a includes an RFID transponder assembly inlay 27 configured to transmit an electro/magnetic signal containing at least a unique, electro/magnetic code and other, travel related information in response to an externally transmitted, radio frequency ("RF") interrogation signal. As indicated in FIG. 2, such assemblies 27 include an antenna or antennas 29 and a small chip 28 containing the remainder of the circuitry operably connected to the antenna(s) 29. Preferably the RFID transponder assembly operates at Ultra High frequency (UHF) or higher to provide extended range compared to high frequency assemblies also in use.

The chip 28 may be active or passive. For cost consideration, a passive system is preferred. Chip 28 includes additional components such as receiving/decoding circuitry, typically a transceiver operably coupled with a decoder and the antenna 29, and power circuitry coupled between the decoding circuitry and transmitting circuitry, including a transponder coupled with the transceiver. The power circuitry being configured to temporarily store or direct energy from a received radio interrogation signal and use that energy to transmit a radio signal response with information. The circuitry of the chip 28 further includes one or more electro/magnetic data storage elements of nonvolatile memory, at least a portion of which is encoded with a unique electro/magnetic identification code that is assigned to and preferably loaded into the RFID chip 28 during manufacture such that it cannot thereafter be altered. Preferably it is the same unique code that is printed in the first variable data field 24 on the first outer side 13 of the tag 10a. The selected chip 28 of the transponder assembly 27 also preferably includes programmable and other non-programmable non-volatile memories or memory regions for additional information, including travel related information. Such ravel information can include a destination airline and flight number(s), reservation numbers(s), etc.

Such RFID chips 28 and entire assemblies 27 are available from a variety of suppliers. An RFID chip 28 that is currently preferred for this use is an Alien Technologies HIGG™-3 EPC Class 1 Gen 2 RFID Tag IC. This chip is operable in the UHF spectrum (860-960 MHz) and is manufactured with at least 800 bits of non-volatile memory including 96 bits for device configuration identification and 64 bits dedicated to a non-alterable, serial TID unique to the chip. It also contains 96-EPC bits (extensible to 480 bits), 32 bits allocated for password access, 32 bits for password kill use and 512 bits available for external programming to contain other user/individual information such as individualized itinerary, flight and/or destination information. The latter may be perma-locked as well as read password protected in 64 bit blocks. The chip works with standard EPC Gen2 Readers.

The tags 10a described above require electronic reading to access the information stored in the RFID chip 28. The unique code 24 can be scanned or visually read. A modification to this basic design would be to replace the conventional second cover sheet 50 with or to position between the second cover sheet 50 and the core 12, a flexible, programmable, electronic display 60 like a sheet of electronic paper or "E-paper". A currently preferred technology from Fujitsu Ltd. uses cholesteric liquid crystals (ChLC) in a flexible thin film display. Such displays can be externally "programmed" to exhibit conventional luggage tag coded information, most importantly destination information 62 (in phantom), as well as other coded information 64 (in phantom) for example a carrier's baggage system code number, so that at least the destination can be visually read by baggage handlers in a conventional fashion without resort to electrical reading equipment needed to access the information on the RFID chip 28 or if the chip should fail. Fujitsu ChLC displays have the advantage of requiring no power to maintain a flicker free image. It will be appreciated that each data field 62, 64 created on the display 60 is also a variable data field of the tag 10a, although an electronically programmable as opposed to permanent printed variable data field like 22-24.

Figure 5:
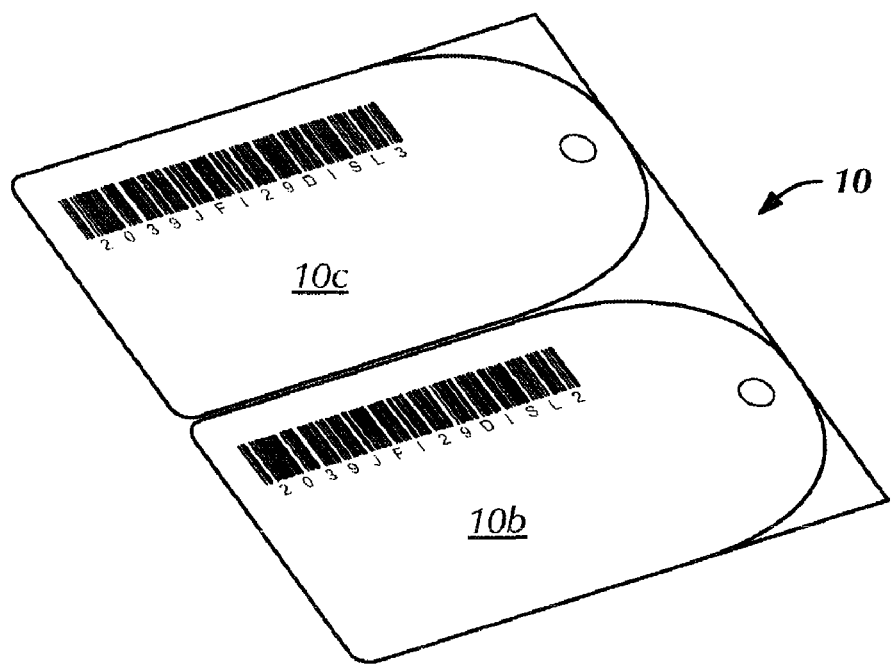
FIG. 5 depicts a pair of luggage tags scored into a larger, rectangular, individual printed sheet product 10.

Physically, although the depicted tag 10a is relatively bullet shaped, it can be rectangular or of virtually any other shape. Preferably, tag 10a is based on an industry standard card size, suggestedly CR-80, CR-90 or CR-100, for example, so that it can be printed on with a standard dye diffusion thermal transfer (d2t2) card printer, which are typically configured to handle one or more of those standard sizes. A variety of Fargo brand card Printers of the Clary Business Machines Company of San Diego, Calif. are configured to print, for example, on CR-80, -90, -100 size card blanks. The standard CR 80 card is rectangular, approximately 3 and ⅜ by 2 and ½ inches in size (85 mm by 54 mm). The Standard CR-90 card size is 3 and ⅞ by 2 and ⅝ inches (92 mm×60 mm), while standard CR-100 size is 3 and ⅞ by 2 and ⅝ inches (98.5 mm×67 mm). Thus, cards printed in any of the CR-80, -90, or -100 formats are nominally less than four inches (100 mm) in length and three and three-quarter inches (70 mm) in width. Alternatively, individual printed luggage tag sheet products can be provided in standard sizes and shapes for use with conventional photo image dye diffusion thermal transfer (d2t2) printers. FIG. 5, for example, depicts a pair of 3"×4" luggage tags 10b, 10c scored into a larger, rectangular, individual printed sheet product 10 that is 4"×6" in size for use with a conventional 4"×6" conventional photo image dye diffusion thermal transfer photo printer. (Other standard stock sizes, e.g. 4"×7", may be handled by different d2t2 photo printers of other manufacturers in an attempt by those manufacturers to capture print stock sales.)

The baggage tag(s) 10a, etc. can be issued to a user in real time, for example at a carrier's baggage check-in or at an independent airport kiosk, or, more preferably, can be issued with the dye diffusion thermal transfer (d2t2) printed variable data field information and delivered to the user prior to use. The exemplary tags 10a offer both options since they are standard sized (e.g. CR 80, 90 or 100 or 4"×6" or 7") and constructed to be printed on with standard dye diffusion thermal transfer (d2t2) printers. So, for example, a tag manufacturer can provide luggage tag blanks in partially printed sheet product form such as individual card banks pre scored in a standard CR or photo size bearing static graphic field(s) on one side (e.g. 32 on 16) or both sides, and preferably a permanently printed unique code to a tag issuer such as an airline. The airline can then reissue the tags themselves at airports directly to travelers or, preferably, to individuals making flight reservations before those individuals travel. The airlines can further distribute such partially preprinted tags or have them distributed to third party distributors such as travel agencies, airport kiosk services and/or other travel-related companies like, hotels, motels, rental car companies, etc., or other businesses, for their completion of the printing and distribution to ultimate travelers.

If issued by an airline or travel agency in response to a reservation, the chip 28 and/or flexible display 60, if provided, of the tag 10a can be preprogrammed with desired information such as travel destination or itinerary information, ticket number(s), confirmation code(s), SSAN, driver's license or passport number(s) or with a single code number providing an address to such information in a separate information data bank, for example, one maintained by the airline on which the baggage is being transported (e.g. reservation system, baggage management system, etc.). The code number can be the unique code 24 assigned to the tag 10a and preferably locked into the chip 28 or assembly 27 at manufacture. A previously issued tag 10a or new tag 10a issued without the desired travel related information may be reprogrammed at airport baggage check-in using a relatively low cost, barcode/RFID scanner/antenna device. If an electronic display 60 is provided, it too can be activated by the end supplier and/or by the airline when the baggage is checked-in.

Figure 6:
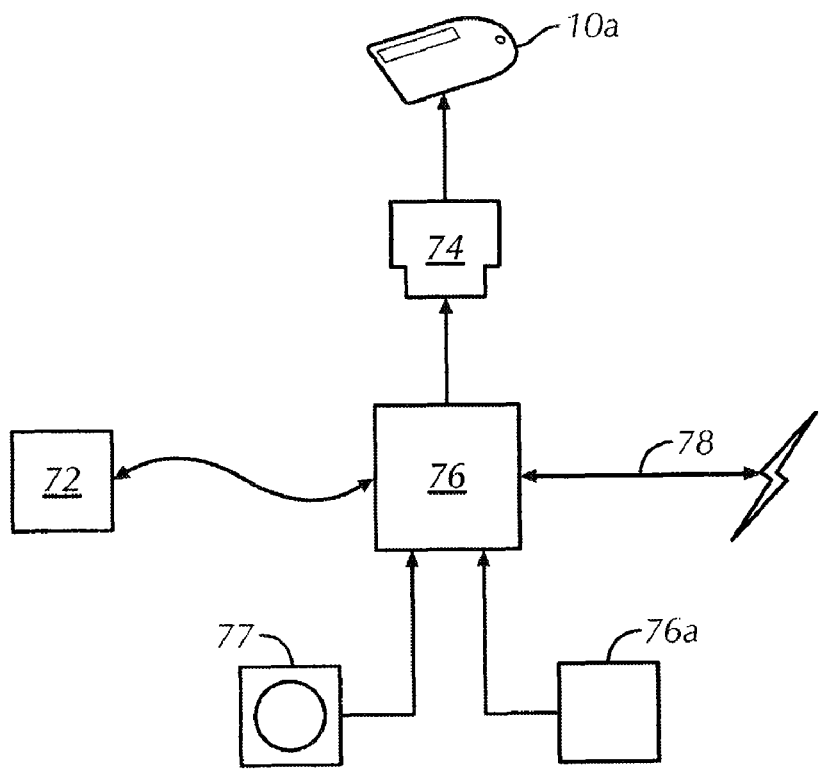
FIG. 6 depicts equipment a tag end distributor would need to prepare luggage tags of the present invention.

Referring to FIG. 6, a tag end distributer would only need an RFID reader/writer 72 and a d2t2 conventional printer 74 connected with a PC or laptop computer or dedicated processor 76 with keyboard or like data entry device 76a and an internet connection 78, e.g. USB port. Personal data can be entered from the keyboard or downloaded from the internet. Digital images 26 can be downloaded from the internet or from an inexpensive digital camera 77 connected with the processor 76. Another alternative for a traveler already in possession of a tag would be to go on-line to an appropriate website, such as the airline or other carrier being used, and write the travel related information to the tag 10a. A small, inexpensive, RFID reader/writer can be connected to a computer's USB port and directed by software (from the airline/other carrier or independently provided) to write flight information and/or other travel related/itinerary information to RFID memory of the tag 10a. The same web page that is acquired for printing out the user's boarding pass can be directed to write to the memory of the tag's RFID assembly information, such as flight no., reservation no., baggage system management (BSM) no., etc.

Figure 4:
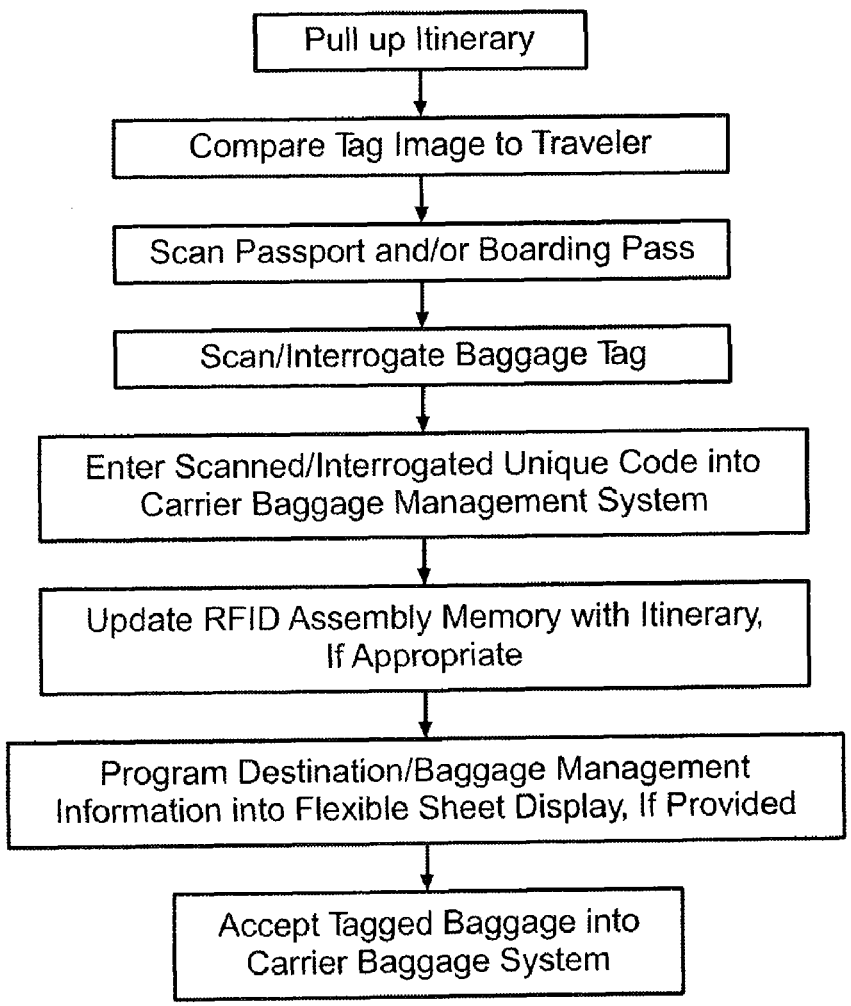

Preferably, during check-in, the RFID assembly is interrogated with a radio frequency signal appropriate to trigger a response from the RFID assembly and information provided by the RFID assembly in response to the interrogating radio frequency signal stored in a carrier's computer system (e.g. reservation and/or baggage system and/or passenger management system). Other steps that are or may be taken at check-in including the addition of travel related information to the memory of the RFID assembly 27 and/or electronic display are indicated in FIG. 4.

Once the information is entered into the airline or other carrier's baggage management system, the tagged baggage can be located and identified anywhere as it travels throughout the carrier's baggage handling system where its location can be identified, from a distance and on the fly, wherever RFID interrogators are located, for example at each baggage conveyor switch, to assure proper routing and continuous monitoring of the baggage. By providing both machine readable coding 24 and RFID tagging, baggage can be read anywhere in the system with either type of tracking technology. By adding a flexible electronic display 60, the destination and other uncoded information that might also be provided can be read and used by human baggage handlers.

Specific manufacturing details and materials, including suggested materials and manufacturing techniques, as well as other configurations of printed sheet products including removable planar, printed identification elements have been disclosed in prior U.S. Pat. No. 7,204,652 attached hereto incorporated by reference herein in its entirety. At least one and preferably both core strips 18, 20 consists essentially of a porous, specifically microvoided, polymer sheet material such as Teslin, a registered trademark ("RTM") of PPG Industries, Pittsburgh, Pa., or Artisyn, a RTM of Daramic, Inc., Charleston, S.C.. Both are both microvoided, polysilicate sheet materials for laser printing. Teslin is described in detail in U.S. Pat. No. 4,861,644 incorporated by reference herein. Teslin is relatively very porous with a porosity of typically forty-five to sixty percent and an average pore size of about one micron or less. The first and second cover strips 40, 50 are suggestedly polyester, which provides good strength, wear and soil resistance properties to the outer surface of the tag 10a. However, other non-porous polymer sheet materials such as PVC or PC may be preferred for other reasons.

Microporous polysilicate sheet provides several distinct advantages. It is waterproof and durable. It also provides faster static decay times and has lower surface resistivity than PVC, PET and PC and can improve RF propagation by up to 2 to 3 db.

The preferred, microporous polysilicate material of core sheets 18, 20 wrap and protect the inlay 27 better than any known non-porous polymer material (or paper). It further provides enhanced electrical performance properties including a 2-3 db increase in RF signal propagation read range, approximately doubling the range of an RFID transponder assembly embedded in conventional, non-porous polymer (e.g. PC, PVC or PET) materials. It also provides faster static decay times and has lower surface resistivity than PVC, PET and PC providing superior static dissipative qualities compared with PVC and/or PE core materials typically used in RFID tags. It is also considerably more durable than PVC and/or PE tags, withstanding flexing and high mechanical pressure and without cracking, pealing or delaminating over wide operating and mechanical stress ranges, increasing the useful life of the tag several fold over PVC or PE core material tags. It further tears and fragments relatively easily making disassembly of the tag for alteration without damage to the core impossible. On the other hand, such microporous polymer materials are poor candidates for direct dye diffusion thermal transfer due to the tendency of the dyes to migrate into the pores. Accordingly, the dye diffusion thermal transfer images provided on the tag must be printed on a layer of non-porous polymer material or special coating over a surface of the microporous polymer material.

While a flexible digital display 60 is preferred, it will be appreciated that the second side of the tag could be provided with a non-porous surface that can accept hand written wax letters or a pocket provided to receive a printed airport/baggage number tag or receipt.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An integral, one-piece, resiliently flexible, planar, reusable, programmable radio frequency identification (RFID) luggage tag blank comprising:

a planar flexible sheet core having major planar opposing first and second sides, the core including at least first and second core strips of flexible, microporous polymer material fixedly and permanently joined together, the microporosity being provided by pores located substantially throughout the microporous polymer material;

a first cover strip integrally and permanently secured to the first major outer side of the core, the first cover strip being coextensive with and forming a first outer side of the tag, the first cover strip including a non-porous, polymer film layer selected to receive a dye diffusion thermal transfer image;

an RFID transponder assembly permanently and integrally imbedded between the first and second first core strips, partially collapsing the porosity of the core strip material enough to maintain an essentially uniform thickness with the transponder assembly imbedded, the transponder assembly including non-volatile memory containing a non-alterable permanent unique code assigned to the transponder assembly and space to receive externally programmable information, both the code and information being transmitted by the transponder assembly upon interrogation; and a unique code permanently printed on at least one the first and second major sides of the tag, the code being unique to the tag and to the RFID assembly.

2. The luggage tag blank of claim 1 wherein the unique code is printed on at least one the first and second major sides of the core.

3. The luggage tag blank of claim 1 further comprising a closed perimeter opening located entirely within and extending entirely transversely through the tag and the core avoiding the RFID assembly.

4. The luggage tag blank of claim 1 further comprising a second polymer layer located against the second major outer side of the core.

5. The luggage tag blank of claim 4 wherein the second polymer layer is a second cover strip of a non-porous, polymer material coextensive with and forming a second outer side of the tag.

6. The luggage tag blank of claim 4 wherein the second polymer layer is a flexible, programmable electronic display.

7. The luggage tag blank of claim 1 being coextensive in area with the core.

8. The luggage tag blank of claim 1 being of a standard CR-80 or CR-90 or CR-100 size.

9. A method of using the luggage tag blank of claim 1 to make a luggage tag comprising the step of permanently printing on the blank, information uniquely identifying an individual assigned the tag.

10. The method of claim 9 wherein the printing step comprising the step of printing a visual image of the individual assigned the tag in a second variable data field.

11. The method of claim 10 wherein the printing step further comprises printing a unique name and address combination in a third variable data field.

12. The luggage tag made by the method of claim 9.

13. A method of using the luggage tag of claim 12 comprising the step of programming into the RFID memory information related to a first travel itinerary of the individual assigned the luggage tag.

14. The method of claim 13 further comprising the step of programming into the memory overwriting the information related to the first travel itinerary, information related to a second, different travel itinerary of the individual.

15. A method of using the luggage tag of claim 12 comprising the steps of:

interrogating the RFID transponder assembly of the luggage tag with a radio frequency signal; and storing information provided by the RFID transponder assembly in response to the interrogating radio frequency signal in a carrier baggage management system.

16. A method of using the luggage tag blank of claim 6 to make a luggage tag comprising the step of permanently printing on the blank, information uniquely identifying an individual assigned the tag.

17. The luggage tag made by the method of claim 16.

18. A method of using the luggage tag of claim 17 comprising the steps of:

programming into the RFID memory information related to a travel itinerary of the individual assigned the luggage tag; and programming the flexible, programmable electronic display to display at least one destination from the travel itinerary programmed into the RFID memory.

19. A method of using the luggage tag blank of claim 3 to make a luggage tag comprising the step of permanently printing on the blank, information uniquely identifying an individual assigned the tag.

20. The luggage tag made by the method of claim 19.

* * * * *